UNITED STATES PATENT OFFICE.

WILLIAM HOOPER, OF TICONDEROGA, NEW YORK, ASSIGNOR TO NEW YORK ORE SEPARATOR COMPANY.

IMPROVEMENT IN PROCESSES OF SEPARATING SLUDGE FROM IRON ORES.

Specification forming part of Letters Patent No. 190,325, dated May 1, 1877; application filed October 27, 1876.

*To all whom it may concern:*

Be it known that I, WILLIAM HOOPER, of Ticonderoga, in the county of Essex and State of New York, have invented a new and useful Improvement in Process of Separating Sludge from Iron Ores, which improvement is fully set forth in the following specification:

This invention relates to an improvement in the process of removing "sludge" from iron ore by exposing the same, in its passage through the crusher, the rolls, and the separating-sieves, to a current of air produced by suction.

The ordinary process of treating iron ore is to expose the same to the action of stamps, for the purpose of reducing it into particles, which are passed through sieves. The small particles, which pass through the meshes of the sieves, drop into the sluice-box, while the large particles, which are retained in the sieves, are shoveled back into the stamping-boxes. The ore, which has reached the desired state of fineness, and which drops into the sluice-boxes, is exposed to the action of a stream of water, for the purpose of washing off the earthy matter or sludge, which is mixed with the reduced ore. By this process of sluicing, however, a quantity of the fine good ore is also washed off, and the result is a waste of from five to twenty-five per cent. of ore.

This loss I have obviated by substituting my suction process to the process of sluicing, for the purpose of removing the sludge. I pass the crude ore through a crusher, then through rolls, and finally through the separating-sieves. The dry sludge becomes disengaged from the particles of ore, and by exposing the mass, during the process of crushing and sifting, to a current of air produced by suction, all the fine and light sludge is carried off, while the heavy particles of ore remain undisturbed, and, even if it should be found that small particles of very fine ore should be carried off with the sludge, such particles can be saved by collecting all the dust in a suitable apparatus, and then exposing it to further treatment, for the purpose of separation.

By these means I am enabled to remove sludge from iron ore without incurring any perceptible loss; and, furthermore, by drawing off the dust from the crusher, the rolls, and the separating-sieves, the danger that the health of the workmen shall be injured by the inhalation of the dust, is avoided.

For the purpose of causing the current of air to act on the sludge, I place over the crusher the rolls and the sieves one or more hoods, which connect, by suitable pipes, with a suction-blower or other suction apparatus.

What I claim as new, and desire to secure by Letters Patent, is—

The within-described process of removing sludge from iron ore by exposing the ore, while being subjected to the action of the crusher, the rolls, and the separating-sieves, to a current of air produced by suction, substantially as herein set forth.

In testimony that I claim the foregoing I have hereunto set my hand and seal this 23d day of October, 1876.

WILLIAM HOOPER. [L. S.]

Witnesses:
   J. B. RAMSAY,
   E. A. BARTLETT.